United States Patent
Gao et al.

(10) Patent No.: US 11,668,760 B2
(45) Date of Patent: Jun. 6, 2023

(54) OPTIMIZATION METHOD, UNIT, AND ELECTRONIC DEVICE OF SHIFTED FREQUENCY (SF)-BASED ELECTROMAGNETIC TRANSIENT SIMULATION

(71) Applicant: Tsinghua University, Beijing (CN)

(72) Inventors: Shilin Gao, Beijing (CN); Ying Chen, Beijing (CN); Shaowei Huang, Beijing (CN); Chen Shen, Beijing (CN); Zhendong Tan, Beijing (CN)

(73) Assignee: Tsinghua University, Beijing (CN)

( * ) Notice: Subject to any disclaimer, the term of this patent is extended or adjusted under 35 U.S.C. 154(b) by 66 days.

(21) Appl. No.: 17/353,529

(22) Filed: Jun. 21, 2021

(65) Prior Publication Data

US 2022/0334194 A1 Oct. 20, 2022

(30) Foreign Application Priority Data

Mar. 31, 2021 (CN) .......................... 202110350904.7

(51) Int. Cl.
*G01R 31/42* (2006.01)
*G01R 23/12* (2006.01)
*G01R 31/40* (2020.01)
*G05F 5/00* (2006.01)

(52) U.S. Cl.
CPC ............. *G01R 31/42* (2013.01); *G01R 23/12* (2013.01); *G01R 31/40* (2013.01); *G05F 5/00* (2013.01); *H02P 2209/00* (2013.01)

(58) Field of Classification Search
CPC ........ G01R 31/42; G01R 23/12; G01R 31/40; H02P 2209/00; G05F 5/00
See application file for complete search history.

(56) References Cited

PUBLICATIONS

Peng et al. ("Simulation of Distribution Network Using Shifted-Frequency Electromagnetic Transient Program," 2020 10th International Conference on Power and Energy Systems (ICPES), 2020, pp. 114-118, doi: 10.1109/ICPES51309.2020.9349695) (Year: 2020).*

(Continued)

*Primary Examiner* — Daniel R Miller
*Assistant Examiner* — Christian T Bryant
(74) *Attorney, Agent, or Firm* — Parsons Behle & Latimer

(57) ABSTRACT

The present disclosure provides an optimization method, a unit, and an electronic device of a shifted frequency (SF)-based electromagnetic transient simulation, comprising: determining a current amplitude and a voltage frequency based on a node voltage and a branch current calculated from a shifted frequency on a basis of a current time step; determining an optimal shifted frequency of the current time step based on the current amplitude and the voltage frequency; and updating the shifted frequency by adopting the optimal shifted frequency of the current time step for calculating a node voltage and a branch current of the next time step. The method, the unit, and the electronic device provided in the present disclosure may gradually update and optimize the shifted frequency in the simulation process so to enable the shifted frequency to reach the best, thus ensuring the accuracy of output current and voltage simulation results.

13 Claims, 4 Drawing Sheets

(56) References Cited

PUBLICATIONS

Tang et al. ("Multi-scale transient modeling and real-time simulation of AC/DC power grid with multi-terminal VSC-HVDC," 2017 IEEE Conference on Energy Internet and Energy System Integration (EI2), 2017, pp. 1-5, doi: 10.1109/EI2.2017.8245500) (Year: 2017).*
Martí ("The Application of Shifted Frequency Analysis in Power System Transient Stability Studies." T. University of British Columbia, 2018. Web. Oct. 17, 2022. <https://open.library.ubc.ca/collections/ubctheses/24/items/1.0364058>. Electronic Theses and Dissertations (ETDs) 2008+) (Year: 2018).*

* cited by examiner

OPTIMIZATION METHOD, UNIT, AND ELECTRONIC DEVICE OF SHIFTED FREQUENCY (SF)-BASED ELECTROMAGNETIC TRANSIENT SIMULATION

CROSS REFERENCE TO RELATED APPLICATION(S)

This patent application claims the benefit and priority of Chinese Patent Application No. 202110350904.7, filed on Mar. 31, 2021, the disclosure of which is incorporated by reference herein in its entirety as part of the present application.

TECHNICAL FIELD

The present disclosure relates to the technical field of electromagnetic transient simulation, and in particular to an optimization method, a unit, and an electronic device of shifted frequency (SF)-based electromagnetic transient simulation.

BACKGROUND ART

Currently, there is no analytical method to accurately evaluate the security and stability level of a large-scale double-high power system, and the power system mode researches and operation scheduling are highly dependent on the time domain simulation. The fault dynamic process of the double-high power system is affected by the switching process of power electronic devices and the fast control protection logic, which is small in time scale, so it is difficult to accurately describe the traditional electromechanical transient simulation. In order to accurately describe the transient process of the double-high power system, the electromagnetic transient simulation program EMTP is required.

When using EMTP to simulate an AC power system, there is an upper limit on the simulation step size due to the existence of an AC carrier frequency of 50 Hz or 60 Hz, which results in a low simulation efficiency. In order to improve the simulation efficiency, a simulation method based on shifted frequency analysis (SFA) is proposed in the prior art. Firstly, a complex signal of voltage and current signals in a power system is constructed on the basis of the Hilbert transform, then a complex envelope signal is obtained by shifted-frequency transformation of the complex signal, and a shifted frequency analysis equation of elements is constructed based on the complex envelope. The frequency of the complex envelope signal is far less than that of the original signal. Therefore, the simulation step size can be increased without loss of accuracy, thus achieving efficient and accurate electromagnetic transient simulation. Many scholars have applied the SF-based simulation method to transmission lines, induction motors, synchronous motors, fans, modular multilevel converters, etc., and established an SF simulation model of the above-mentioned elements.

It can be seen that all SF-based electromagnetic simulations have a shifted frequency of 50 Hz (or 60 Hz) in the simulation process. However, the fundamental frequency may not be the optimal shifted frequency. If a signal in the simulation contains multiple frequency components, such as in the case of harmonic voltages and oscillating voltages, there may still be great errors in the simulation when the frequency spectrum takes the fundamental frequency as the shifted frequency.

Therefore, the issue of avoiding great simulation errors due to the fact that the adopted fundamental frequency is not the optimal shifted frequency for the SF-based electromagnetic simulation in the prior art still requires urgent solutions by technicians in this field.

SUMMARY

The present disclosure provides an optimization method, a unit and an electronic device of a shifted frequency (SF)-based electromagnetic transient simulation, which are used for solving the problem of great simulation errors due to the fact that the adopted fundamental frequency is not the optimal shifted frequency for the SF-based electromagnetic simulation in the prior art. By optimizing and updating the shifted frequency in every time step where the voltage and the current are solved in the electromagnetic transient simulation, the shifted frequency gradually reaches the optimal value along with the time step, namely the best match with the set time step may lead to the highest simulation accuracy. Therefore, the electromagnetic transient simulation that is carried out after the shifted frequency reaches the best may output accurate current and voltage results.

The present disclosure provides an optimization method, a unit and an electronic device of a shifted frequency (SF)-based electromagnetic transient simulation, including:

Determining a current amplitude and a voltage frequency based on a node voltage and a branch current calculated from a shifted frequency on a basis of a current time step;

Determining an optimal shifted frequency of the current time step based on the current amplitude and the voltage frequency; and Updating the shifted frequency by adopting the optimal shifted frequency of the current time step for calculating a node voltage and a branch current of the next time step.

The optimization method of the SF-based electromagnetic transient simulation according to the present disclosure also includes:

If the next time step reaches a default simulation time, ending the calculation of the node voltage and the branch current of the next time step.

In the optimization method of the SF-based electromagnetic transient simulation according to the present disclosure, the step of determining the optimal shifted frequency of the current time step based on the current amplitude and the voltage frequency specifically includes:

By taking the minimum error between a measured analytic signal response (determined by the current amplitude and the voltage frequency) and a theoretical analytic signal response (determined by the current amplitude and the voltage frequency) as a constraint, determining the optimal shifted frequency of the current time step.

In the optimization method of the SF-based electromagnetic transient simulation according to the present disclosure, the determination of the measured analytic signal response specifically includes:

Determining an input of a linear time-invariant (LTI) system based on the current amplitude and the voltage frequency; and Determining a measured analytic signal response in the SF-based electromagnetic transient modeling based on the input.

In the optimization method of the SF-based electromagnetic transient simulation according to the present disclosure, the measured analytic signal response $o_{st}(t)$ is calculated by the following formula:

$$o_{st}(t) = \frac{K_I A}{j2\pi f} \frac{\pi f \Delta t}{\pi f_s \Delta t + \tan(\pi (f - f_s)\Delta t)} e^{j2\pi ft}$$

Wherein $\Delta t$ is the time-step size, $f_s$ is the optimal shifted frequency to be determined of a current time step, f is the voltage frequency, A is the current amplitude, and $K_I$ is the gain of the linear time-invariant (LTI) system.

In the optimization method of the SF-based electromagnetic transient simulation according to the present disclosure, an error between the measured analytic signal response and a theoretical analytic signal response (determined by the current amplitude and the voltage frequency) is expressed by the following formula:

$$\varepsilon_S(t) = e^{j2\pi ft} \frac{K_I A}{j2\pi f} \left(1 - \frac{\pi f \Delta t}{\pi f_s \Delta t + \tan(\pi (f - f_s)\Delta t)}\right)$$

Wherein $\varepsilon_s(t)$ is an error between the measured analytic signal response $o_{st}(t)$ and the theoretical analytic signal response $$o_s(t), \ o_s(t) = \frac{K_I A}{j2\pi f} e^{j2\pi ft};$$

Correspondingly, the step of taking the minimum error between a measured analytic signal response (determined by the current amplitude and the voltage frequency) and a theoretical analytic signal response (determined by the current amplitude and the voltage frequency) as a constraint specifically includes:

$\varepsilon_s(t)$ is reduced into a square of 2-norm error $\varepsilon_{sqn}$:

$$\varepsilon_{sqn} = c \left(\frac{K_I}{2\pi f} \frac{\pi (f_s - f)\Delta t + \tan(\pi (f - f_s)\Delta t)}{\pi f_s \Delta t + \tan(\pi (f - f_s)\Delta t)}\right)^2$$

$$c = \sum_{k=0}^{n} \left(A^2 \frac{1 - \cos(4\pi f k \Delta t)}{2}\right), \ n = \frac{T_s}{\Delta t}, \ k \times \Delta t = t$$

Where $T_s$ is a default simulation time, and k is a number of time steps at time t;

When $f_s$ and $\Delta t$ satisfy a constraint $|f-f_s|<f \& |f-f_s|\Delta t <<1$, $f_s$ in a min $\varepsilon_s(t)$ optimization model is determined.

In the optimization method of the SF-based electromagnetic transient simulation according to the present disclosure, if there are m frequency component inputs in the linear time-invariant (LTI) system, the square of the 2-norm error is calculated by the following formula:

$$\varepsilon_{sqn} = K_I^2 \frac{\pi^2 \Delta t^4}{36} \sum_{i=1}^{m} c_i \frac{(f_i - f_s)^6}{f_i^4}$$

Wherein $$C_i = \sum_{k=0}^{n} \left(A_i^2 \frac{1 - \cos(4\pi f_i k \Delta t)}{2}\right) > 0,$$

and $f_i$ is the ith frequency, so that $f_1 < \ldots < f_i < \ldots < f_m$, and $A_i$ is an amplitude of the ith frequency component.

The present disclosure also provides an optimization unit of the shifted frequency (SF)-based electromagnetic transient simulation, including:

An original unit, used for determining a current amplitude and a voltage frequency based on a node voltage and a branch current calculated from a shifted frequency on a basis of a current time step;

An optimal SF unit, used for determining an optimal shifted frequency of the current time step based on the current amplitude and the voltage frequency; and An updating unit, used for updating the shifted frequency by adopting the optimal shifted frequency of the current time step for calculating a node voltage and a branch current of the next time step.

The present disclosure also provides an electronic device, including a memory, a processor, and a computer program stored on the memory and running on the processor, wherein the processor, when executing the program, implements steps of the optimization method of the shifted frequency (SF)-based electromagnetic transient simulation according to any one of the above descriptions.

The present disclosure also provides a transient computer-readable storage medium, wherein a computer program is stored on the storage medium and, when executed by a processor, implements steps of the optimization method of the shifted frequency (SF)-based electromagnetic transient simulation according to any one of the above descriptions.

The present disclosure provides an optimization method, a unit, and an electronic device of a shifted frequency (SF)-based electromagnetic transient simulation, which are used for determining a current amplitude and a voltage frequency based on a node voltage and a branch current calculated from a shifted frequency on a basis of a current time step; determining an optimal shifted frequency of the current time step based on the current amplitude and the voltage frequency; and updating the shifted frequency by adopting the optimal shifted frequency of the current time step for calculating a node voltage and a branch current of the next time step. By optimizing and updating the shifted frequency in every time step where the voltage and the current are solved in the electromagnetic transient simulation, the shifted frequency gradually reaches the optimal value along with the time step, namely the best match with the set time step may lead to the highest simulation accuracy. Therefore, the electromagnetic transient simulation that is carried out after the shifted frequency reaches the best may output accurate current and voltage simulation results. Therefore, the method, the unit, and the electronic device provided in the present disclosure may gradually update and optimize the shifted frequency in the simulation process so to enable the shifted frequency to reach the best, thus ensuring the accuracy of output current and voltage simulation results.

BRIEF DESCRIPTION OF THE DRAWINGS

In order to illustrate technical schemes of the present disclosure or in the prior art more clearly, the accompanying drawings required in the embodiments or prior art will be briefly introduced below. Apparently, the drawings in the following description are some embodiments of the present disclosure, and those of ordinary skills in the art may obtain other drawings according to these drawings without creative work.

DETAILED DESCRIPTION OF THE EMBODIMENTS

Figure 1:
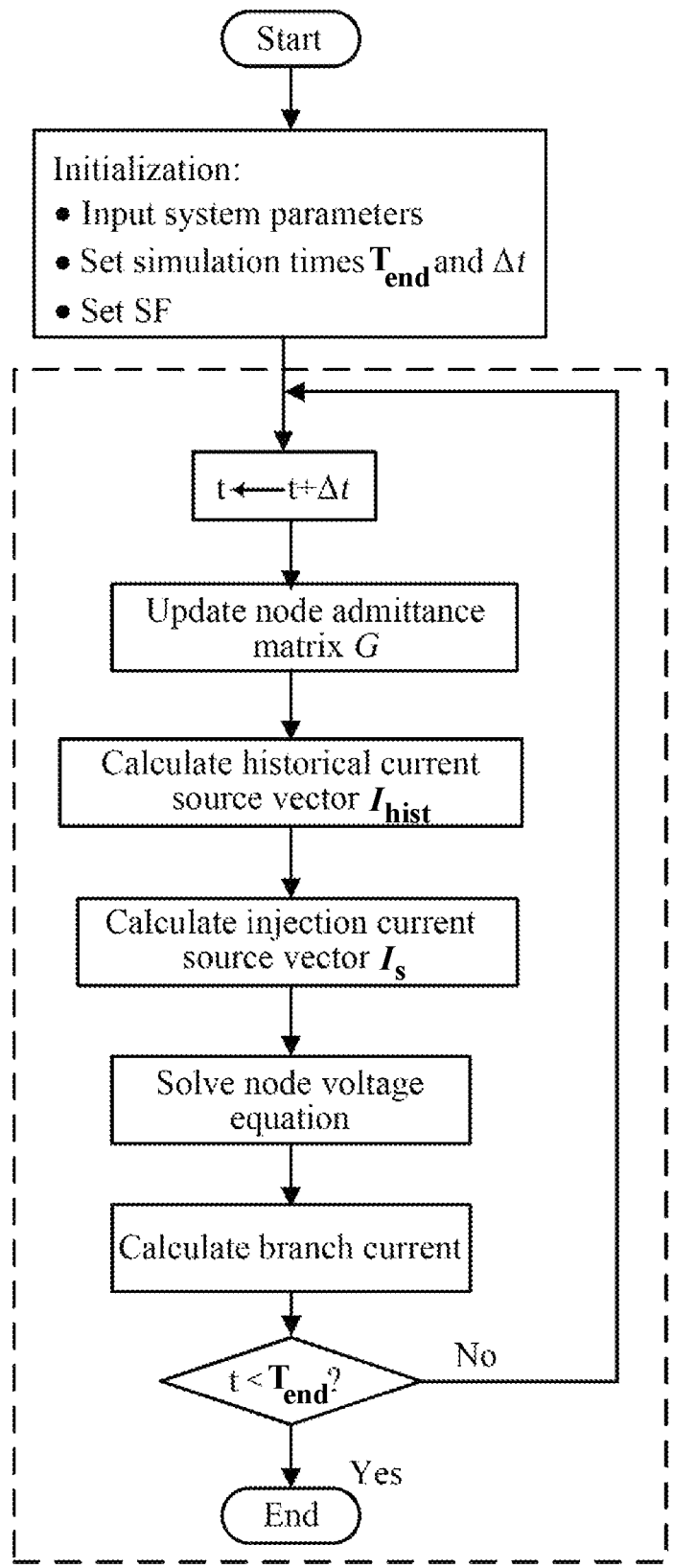
FIG. 1 is a process schematic of an SF-Based electromagnetic transient simulation provided in the prior art.

So that the above-mentioned purposes, technical schemes and advantages of the present disclosure can be more apparently understood, the technical schemes of the present disclosure will be described clearly and completely with reference to the accompanying drawings thereof. Apparently, the embodiments described herein are part of, not all of, embodiments in the present disclosure. Based on the embodiments of the present disclosure, all other embodiments obtained by those of ordinary skills in the art without creative work belong to the scope claimed by the present disclosure.

First of all, the SF-Based transient modeling and simulation technique in the prior art is introduced briefly as follows:

I SF-Based Electromagnetic Transient Modeling

A real signal x(t) in an AC power network can be expressed in the form of an SF domain:

$$x_e(t) = x_s(t) e^{-j\omega_s t} \quad (1)$$

Wherein $\omega_s = 2\pi f_s$, $f_s$ is the shifted frequency. $x_e(t)$ is an analytic envelope of x(t), $x_s(t)$ is an associated analytic signal of x(t), which may be expressed as:

$$x_s(t) = x(t) + j x_H(t) \quad (2)$$

Wherein $x_H(t)$ is the Hilbert transform of x(t).

It is assumed that the dynamic equation of a power system element can be expressed as $$\frac{dx}{dt} = F(x, t),$$

the dynamic equation of which in the form of the SF domain can be expressed as:

$$\frac{dx_e(t)}{dt} = F(x_e(t), t) - j\omega_s x_e(t). \quad (3)$$

By using the trapezoidal rule, formula (3) may be discretized into:

$$x_{et}(t) = x_{et}(t - \Delta t) + \frac{\Delta t}{2}[F(x_{et}(t), t) - j\omega_s x_{et}(t) + F(x_{et}(t - \Delta t), t - \Delta t) - j\omega_s x_{et}(t - \Delta t)] \quad (4)$$

Wherein $\Delta t$ is the time-step size, and $x_{et}(t)$ is the solution of formula (3) in the SF domain. $x_{et}(t)$ may be transformed into an analytic signal $x_{st}(t)$ by multiplying $e^{j\omega_s t}$, and may be expressed as:

$$x_{st}(t)| = x_{st}(t - \Delta t)e^{j\omega_s \Delta t} + \frac{\Delta t}{2}[F(x_{st}(t), t) - j\omega_s x_{st}(t) + F(x_{st}(t - \Delta t), t - \Delta t)e^{j\omega_s \Delta t} - j\omega_s x_{st}(t - \Delta t)e^{j\omega_s \Delta t}] \quad (5)$$

According to formula (5), an SF-based electromagnetic transient model can be established for each element of the power system. When all SF-based electromagnetic transient models of all elements in the system are established, the SF-based electromagnetic transient model of the system can be solved according to the process of the node analysis method.

II SF-Based Electromagnetic Transient Simulation Process

FIG. 1 is a process schematic of an SF-Based electromagnetic transient simulation provided in the prior art. As shown in FIG. 1, the time step of each cycle includes the following steps:

Step 1: an equivalent node admittance matrix G is calculated;

Step 2: according to the node voltage and branch current, the historical current source Ihist is calculated;

Step 3: according to the node voltage and branch current, etc., the injection current Is is calculated;

Step 4: the node voltage equation GU=Is+Ihist is solved to obtain the node voltage of the system.

Step 5: the branch current is calculated, and the process enters the next cycle of solution.

In the process, at the beginning of simulation, it is necessary to initialize the system, namely to input system parameters, set a simulation time T, a time step $\Delta t$ and an initial shifted frequency, wherein the initial shifted frequency is usually determined in the range of 50-60 Hz. The process of the SF-based electromagnetic transient simulation in FIG. 1 is the same as that of EMTP, except that their node admittance matrices, injection currents and historical current sources are calculated in different ways.

Figure 2:
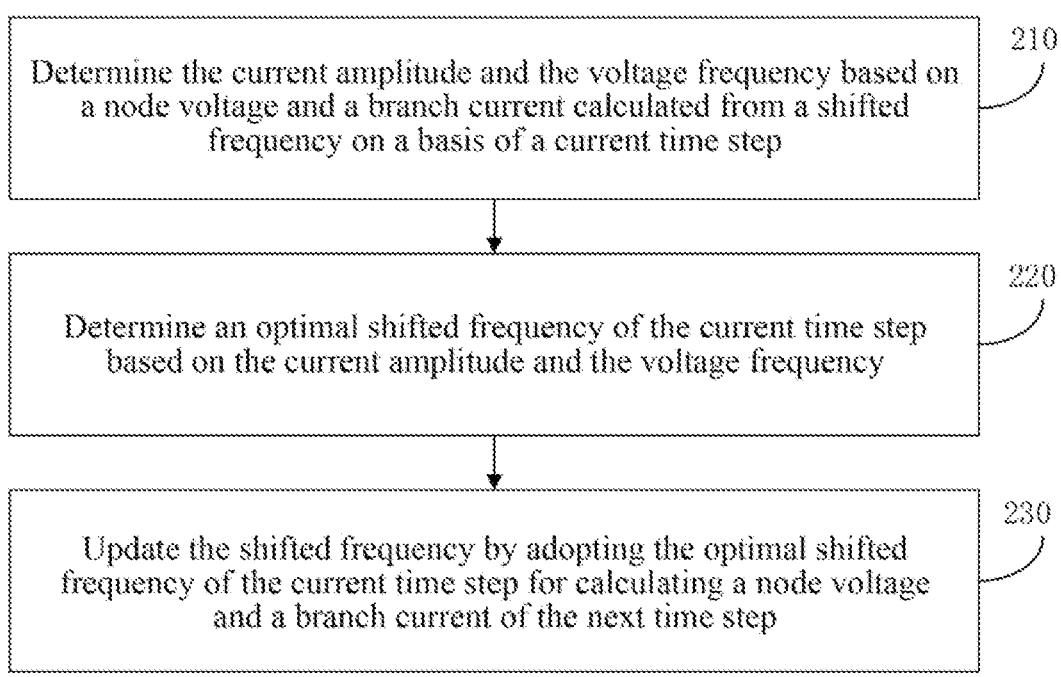
FIG. 2 is a process schematic of an optimization method of the SF-based electromagnetic transient simulation provided in the present disclosure.

However, great simulation errors are widely existing due to the fact that the adopted fundamental frequency is not the optimal shifted frequency for the SF-based electromagnetic simulation in the prior art. The optimization method of the SF-based electromagnetic transient simulation according to the present disclosure is described below by reference to FIGS. 2-5. FIG. 2 is a process schematic of an optimization method of the SF-based electromagnetic transient simulation provided in the present disclosure. As shown in FIG. 2, the method includes:

Step 210: Determining the current amplitude and the voltage frequency based on a node voltage and a branch current calculated from a shifted frequency on a basis of a current time step.

Figure 3:
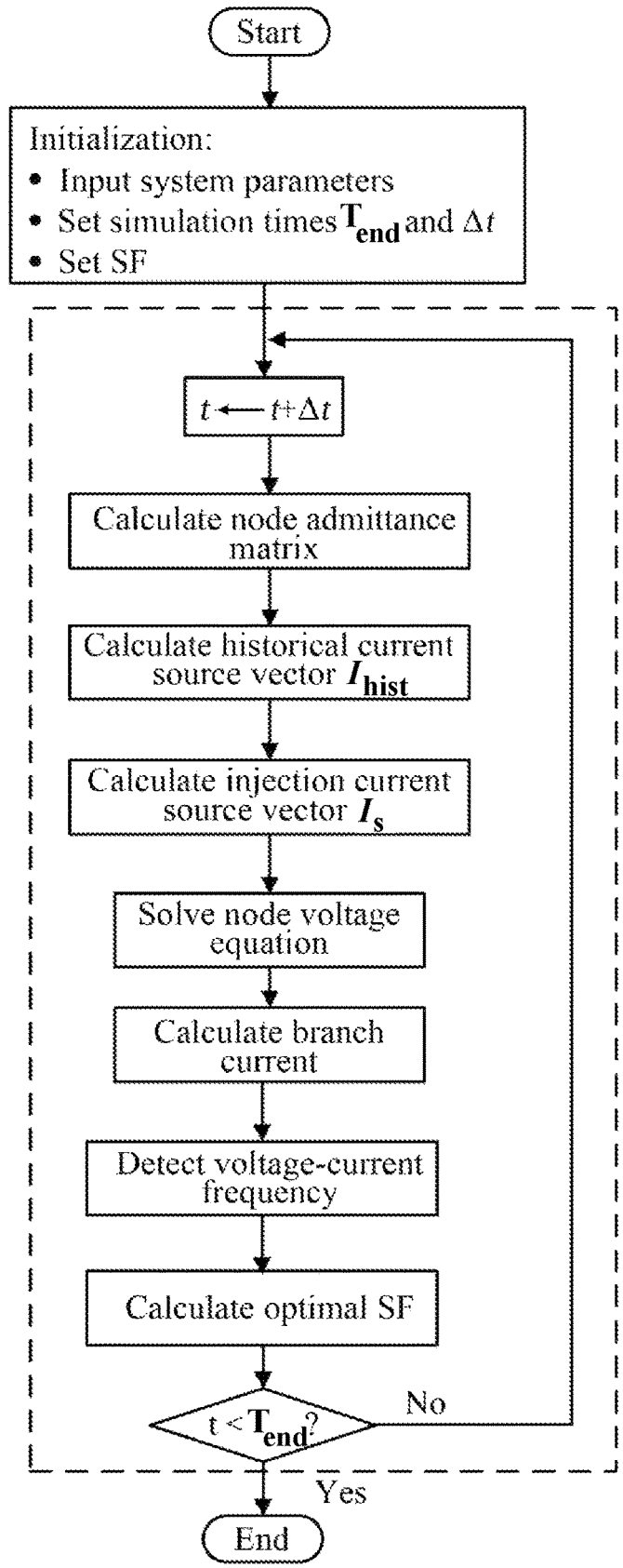
FIG. 3 is a process schematic of the optimized SF-based electromagnetic transient simulation provided in the present disclosure.

Specifically, the optimization method of the SF-based electromagnetic transient simulation provided by the present disclosure is the improved version of the SF-based electromagnetic simulation in the prior art, and the SF-based electromagnetic transient simulation process corresponding to the improved optimization method adds adjustment and optimization to the shifted frequency at each simulation time step, thus enabling the adjustment of the shifted frequency in real-time. FIG. 3 is a process schematic of the optimized SF-based electromagnetic transient simulation provided in the present disclosure. As shown in FIG. 3, the optimized SF-based electromagnetic transient simulation flow provided by the present disclosure is only based on the SF-based electromagnetic transient simulation process in the prior art as shown in FIG. 1, with the voltage-current frequency detection and the optimal shifted frequency calculation being added into the end of each cycle of time step. Therefore, the optimization method provided by the present disclosure focuses on describing the solution of the optimal shifted frequency added in the simulation process. For each cycle of time step in the simulation, after the node voltage and branch current of the simulation result of this cycle are obtained, the frequency of node voltage and the amplitude of branch current are determined on the basis of the simulation result.

Step 220: Determining an optimal shifted frequency of the current time step based on the current amplitude and the voltage frequency.

Specifically, after the current amplitude and voltage frequency are determined, the shifted frequency that has minimum errors between the measured values and the theoretical values of some physical parameters can be solved on the basis of the current amplitude and voltage frequency. In this step, the measured values and theoretical values of some physical parameters are determined by different modeling models. Since the simulation provided by the present disclosure is an SF-based electromagnetic transient simulation, the simulation process conforms to the SF-based electromagnetic transient modeling model, and the node voltage and branch current in the simulation circuit are required to approach the most ideal linear time-invariant (LTI) system model in theoretical values. Therefore, based on the current amplitude and voltage frequency of the current simulation result, the model value of a certain parameter calculated according to the SF-based electromagnetic transient modeling model is necessary to get close to the theoretical value of the certain parameter, so that the SF-based electromagnetic transient modeling may be ensured to approximate the ideal accuracy, and the shifted frequency obtained in such an approximately ideal accuracy is the optimal shifted frequency. It should be noted that the certain parameter mentioned above is usually the response of an input signal. As a physical parameter, only the response requires the shifted frequency in the SF-based electromagnetic transient modeling model for calculation.

Step 230: Updating the shifted frequency by adopting the optimal shifted frequency of the current time step for calculating a node voltage and a branch current of the next time step.

Specifically, the optimal shifted frequency calculated at the current time step can be used to update the shifted frequency in the SF-based electromagnetic transient simulation. During the SF-based electromagnetic transient simulation in the next cycle of time step, the branch current and node voltage of the next cycle of time step are calculated according to the updated shifted frequency in the current cycle. In this way, the real-time optimization in the simulation process is realized, and the shifted frequency is adjusted at each time step based on the difference between the simulation result and the theoretical value at the current time step, so that the shifted frequency gradually reaches the optimum through adjustment.

The present disclosure provides an optimization method of a shifted frequency (SF)-based electromagnetic transient simulation, which are used for determining a current amplitude and a voltage frequency based on a node voltage and a branch current calculated from a shifted frequency on a basis of a current time step; determining an optimal shifted frequency of the current time step based on the current amplitude and the voltage frequency; and updating the shifted frequency by adopting the optimal shifted frequency of the current time step for calculating a node voltage and a branch current of the next time step. By optimizing and updating the shifted frequency in every time step where the voltage and the current are solved in the electromagnetic transient simulation, the shifted frequency gradually reaches the optimal value along with the time step, namely the best match with the set time step may lead to the highest simulation accuracy. Therefore, the electromagnetic transient simulation that is carried out after the shifted frequency reaches the best may output accurate current and voltage simulation results. Therefore, the method provided in the present disclosure may gradually update and optimize the shifted frequency in the simulation process so to enable the shifted frequency to reach the best, thus ensuring the accuracy of output current and voltage simulation results.

According to the above embodiments, the method also includes:

If the next time step reaches a default simulation time, ending the calculation of the node voltage and the branch current of the next time step.

Specifically, as shown in FIG. 3, it is necessary to input the default simulation time Tend during simulation, namely to end the simulation at the current time step, and if it is found that the default simulation time Tend has been reached at the next time step, the simulation ends without further calculation of node voltage and branch current at the next time step. It should be noted here that during the simulation process within the default simulation time, in the first part of the time, the shifted frequency is still gradually adjusted to reach the optimal value, and in the second part of the time, the simulation is performed in the case that the shifted frequency has reached the optimal value, so that the output simulation result of the node voltage and the branch current will be more accurate. As a result, the simulation result in the first part of the default simulation time is not high in accuracy. As the shifted frequency gradually approaches the optimal value, the simulation result in the second part of the time is gradually improved in accuracy and finally maintains a high level of accuracy.

According to the above embodiments, in this method, the step of determining an optimal shifted frequency of the current time step based on the current amplitude and the voltage frequency specifically includes:

By taking the minimum error between a measured analytic signal response (determined by the current amplitude and the voltage frequency) and a theoretical analytic signal response (determined by the current amplitude and the voltage frequency) as a constraint, determining the optimal shifted frequency of the current time step.

Specifically, the analytic signal is used as a physical parameter to measure whether the shifted frequency electromagnetic transient modeling model is close to the theoretical ideal model. Therefore, in the shifted frequency electromagnetic transient modeling model, the measured analytic signal response under the current amplitude and voltage frequency is determined by SF-based mathematical modeling rules, while in the theoretical ideal model, the theoretical analytical signal response under the current amplitude and voltage frequency is determined by the LTI system ideal model. Since the final expression of the measured analytical signal response includes the shifted frequency, the error between the measured analytical signal response and the theoretical analytical signal response includes the shifted frequency that needs to be optimized and adjusted. When the minimum error is set as the constraint, the determined associated shifted frequency is the optimal shifted frequency at the current cycle of simulation time step.

According to the above-mentioned embodiments, the determination of the measured analytic signal response in the method specifically includes:

Determining an input of a linear time-invariant (LTI) system based on the current amplitude and the voltage frequency; and Determining a measured analytic signal response in the SF-based electromagnetic transient modeling based on the input.

In particular, the linear time invariant (LTI) system may be expressed as:

$$\frac{do(t)}{dt} = K_I u(t) \quad (6)$$

Wherein $K_I$, u(t), and o(t) are respectively the gain, the input and the response; the analytical signal of formula (6) is of the following form:

$$\frac{do_s(t)}{dt} = K_I u_s(t) \quad (7)$$

Wherein $u_s(t)$ and $o_s(t)$ are associated analytic signals of u(t) and o(t). For a stationary input, it can be represented as the superposition of multiple frequency components. The response of an LTI system to the input is the superposition of the response of each frequency component. Thus, the response of a single frequency component is first analyzed here. Assume that the input of the system is:

$$u(t) = A \cos(2\pi f t) \quad (8)$$

Where A and f are the amplitude and frequency of the input, respectively. The analytic signal form of the input is expressed by formula (9) below:

$$u_s = A e^{j2\pi f t} \quad (9)$$

Since the optimization method of the SF-based electromagnetic transient simulation provided by the present disclosure is constructed on the basis of the SF-based electromagnetic transient modeling technology in the prior art, the applied SF-based electromagnetic transient modeling rules are also consistent with those in the prior art. As a result, the measured analytical signal response in the SF-based electromagnetic transient modeling is determined according to the input of the LTI system, which means substituting formulas (7) and (9) into the formula (5) of the SF-based electromagnetic transient modeling in the prior art mentioned above, so as to obtain the following formula:

$$o_{st}(t) = \frac{K_I A}{j2\pi f} \frac{\pi f \Delta t}{\pi f_s \Delta t + \tan(\pi(f - f_s)\Delta t)} e^{j2\pi f t}$$

In the formula, $o_{st}(t)$ is the measured analytic signal response determined by the SF-based electromagnetic transient modeling rule.

According to the above embodiments, in this method, the measured analytic signal response $o_{st}(t)$ is calculated by the following formula:

$$o_{st}(t) = \frac{K_I A}{j2\pi f} \frac{\pi f \Delta t}{\pi f_s \Delta t + \tan(\pi(f - f_s)\Delta t)} e^{j2\pi f t}$$

Wherein $\Delta t$ is the time-step size, $f_s$ is the optimal shifted frequency to be determined of a current time step, f is the voltage frequency, A is the current amplitude, and $K_I$ is the gain of the linear time invariant (LTI) system.

Specifically, the calculation formula of analytical signal response in the case of SF-based electromagnetic transient modeling has been described above, and, given the input analytical signal form, the calculation formula of the measured analytical signal response $o_{st}(t)$ may be obtained simply by substituting the input analytical signal into the above-mentioned calculation formula.

According to the above embodiment, in this method, an error between the measured analytic signal response and a theoretical analytic signal response (determined by the current amplitude and the voltage frequency) is expressed by the following formula:

$$\varepsilon_s(t) = e^{j2\pi f t} \frac{K_I A}{j2\pi f}\left(1 - \frac{\pi f \Delta t}{\pi f_s \Delta t + \tan(\pi(f - f_s)\Delta t)}\right)$$

Wherein $\varepsilon_s(t)$ is an error between the measured analytic signal response $o_{st}(t)$ and the theoretical analytic signal response $o_s(t)$, $$o_s(t) = \frac{K_I A}{j2\pi f} e^{j2\pi f t};$$

Correspondingly, the step of taking the minimum error between a measured analytic signal response (determined by the current amplitude and the voltage frequency) and a theoretical analytic signal response (determined by the current amplitude and the voltage frequency) as a constraint specifically comprises:

$\varepsilon_s(t)$ is reduced into a square of 2-norm error $\varepsilon_{sqn}$:

$$\varepsilon_{sqn} = c\left(\frac{K_I}{2\pi f} \frac{\pi(f_s - f)\Delta t + \tan(\pi(f - f_s)\Delta t)}{\pi f_s \Delta t + \tan(\pi(f - f_s)\Delta t)}\right)$$

$$c = \sum_{k=0}^{n}\left(A^2 \frac{1 - \cos(4\pi f k \Delta t)}{2}\right), n = \frac{T_s}{\Delta t}, k \times \Delta t = t$$

Where $T_s$ is a default simulation time, and k is a number of time steps at time t;

When $f_s$ and $\Delta t$ satisfy a constraint $|f-f_s|<f \& |f-f_s|\Delta t<<1$, $f_s$ is in a min $\varepsilon_s(t)$ optimization model is determined.

Specifically, the theoretical accurate response to the input analytic signal (i.e., theoretical analytical signal response) provided by the LTI system to the formula (9) is expressed by the following formula (11):

$$o_s(t) = \frac{K_I A}{j2\pi f} e^{j2\pi ft} \tag{11}$$

Therefore, an error between the measured analytic signal response and the theoretical analytic signal response (determined by the current amplitude and the voltage frequency) is determined by a difference between formulas (10) and (11):

$$\varepsilon_s(t) = e^{j2\pi ft}\frac{K_I A}{j2\pi f}\left(1 - \frac{\pi f \Delta t}{\pi f_s \Delta t + \tan(\pi(f-f_s)\Delta t)}\right) \tag{12}$$

Wherein $\varepsilon_s(t)$ is an error between the measured analytic signal response $o_{st}(t)$ and the theoretical analytic signal response $o_s(t)$, $$o_s(t) = \frac{K_I A}{j2\pi f}e^{j2\pi ft};$$

The real part $\varepsilon(t)$ of $\varepsilon_s(t)$ is extracted separately by the following formula (13) as the deviation between the accurate response of the LTI system to u(t) and the SF-based simulation result:

$$\varepsilon(t) = \frac{K_I A}{2\pi f}\left(1 - \frac{\pi f \Delta t}{\pi f_s \Delta t + \tan(\pi(f-f_s)\Delta t)}\right)\sin(2\pi ft) \tag{13}$$

The square of the 2-norm error $\varepsilon_{sqn}$ of the SF-based electromagnetic transient simulation can be calculated as the following formula (14):

$$\varepsilon_{sqn} = c\left(\frac{K_I}{2\pi f}\frac{\pi(f_s-f)\Delta t + \tan(\pi(f-f_s)\Delta t)}{\pi f_s \Delta t + \tan(\pi(f-f_s)\Delta t)}\right)^2 \tag{14}$$

In formula (14):

$$c = \sum_{k=0}^{n}\left(A^2\frac{1-\cos(4\pi fk\Delta t)}{2}\right), n = \frac{T_s}{\Delta t}, k\times\Delta t = t \tag{15}$$

Where $T_s$ is the simulation time, and k is a number of time steps at time t;

It can be seen from the theory of SF-based electromagnetic transient modeling, fs and $\Delta t$ should satisfy the conditions in formula (16) so as to ensure the simulation accuracy.

$$|f-f_s|<f \& |f-f_s|\Delta t<<1 \tag{16}$$

In the premise of the constraint of formula (16), Taylor-McLaughlin series can be used to expand the tangent function in formula (14):

$$\tan(\pi(f-f_s)\Delta t) \approx \pi(f-f_s)\Delta t + \tfrac{1}{3}(\pi(f-f_s)\Delta t)^3 \tag{17}$$

By substituting formula (17) into formula (14), so that $$\varepsilon_{sqn} = c\left(\frac{K_I}{2\pi f}\frac{1/3(\pi(f-f_s)\Delta t)^3}{\pi f\Delta t + 1/3(\pi(f-f_s)\Delta t)^3}\right)^2 \tag{18}$$

By using the constraint in formula (16), it is easily found that $\pi f\Delta t >> \tfrac{1}{3}(\pi(f-f_s)\Delta t)^3$. Therefore, $\tfrac{1}{3}(\pi(f-f_s)\Delta t)^3$ in the denominator may be omitted in formula (18). In this way, $\varepsilon_{sqn}$ may be approximated to:

$$\varepsilon_{sqn} = cK_I^2\frac{\pi^2\Delta t^4}{36}\frac{(f-f_s)^6}{f^4} \tag{19}$$

According to the above embodiment, in this method, if there are m frequency component inputs in the linear time-invariant (LTI) system, the square of the 2-norm error $\varepsilon_{sqn}$, is calculated by the following formula:

$$\varepsilon_{sqn} = K_I^2\frac{\pi^2\Delta t^4}{36}\sum_{i=1}^{m}c_i\frac{(f_i-f_s)^6}{f_i^4}$$

Wherein $$c_i = \sum_{k=0}^{n}\left(A_i^2\frac{1-\cos(4\pi f_i\Delta t)}{2}\right) > 0,$$

$f_i$ is the ith frequency, so that $f_1 < \ldots < f_i < \ldots < f_m$, and Ai is an amplitude of the ith frequency component.

Specifically, for an input containing m frequency components, the square of the 2-norm error of the SF-based electromagnetic transient simulation in the LTI system is:

$$\varepsilon_{sqn} = K_I^2\frac{\pi^2\Delta t^4}{36}\sum_{i=1}^{m}c_i\frac{(f_i-f_s)^6}{f_i^4} \tag{20}$$

Wherein $$c_i = \sum_{k=0}^{n}\left(A_i^2\frac{1-\cos(4\pi f_i\Delta t)}{2}\right) > 0,$$

$f_i$ is the ith frequency, so that $f_1 < \ldots < f_i < \ldots < f_m$, and Ai is an amplitude of the ith frequency component.

In order to solve the minimum value of $\varepsilon_{sqn}$ when $f_s$ changes, a derivative (defined as $\varepsilon'_{sqn}(f_s)$) of $\varepsilon_{sqn}$ with respect to $f_s$ can be derived as follows:

$$\varepsilon'_{sqn}(f_s) = \frac{\partial \varepsilon_{sqn}}{\partial f_s} = -K_I^2\frac{\pi^2\Delta t^4}{6}\sum_{i=1}^{m}c_i\frac{(f_i-f_s)^5}{f_i^4} \tag{21}$$

$\varepsilon'_{sqn}$ has a derivative with respect to $f_s$ (defined as $\varepsilon'_{sqn}(f_s)$) is:

$$\varepsilon''_{sqn}(f_s) = \frac{\partial \varepsilon'_{sqn}(f_s)}{\partial f_s} = K_f^2 \frac{5\pi^2 \Delta t^4}{6} \sum_{i=1}^{m} c_i \frac{(f_i - f_s)^4}{f_i^4}. \quad (22)$$

Since $c_i > 0$, it can be found that $\varepsilon'_{sqn}(f_s) > 0$. It indicates that $\varepsilon'_{sqn}(f_s)$ is a monotonic function about $f_s$. It is assumed that:

$$\varepsilon'_{sqn}(f_s) = 0 \quad (23)$$

Since $f_1 < \ldots < f_m$, it can be found that $$\sum_{i=1}^{m} (f_i - f_1)^5 > 0$$

and $$\sum_{i=1}^{m} (f_i - f_m)^5 < 0$$

Therefore, $\varepsilon'_{sqn}(f_1) < 0$, $\varepsilon'_{sqn}(f_m) > 0$. It indicates the unique solution of formula (23) (i.e., the optimal SF that minimizes the $\varepsilon_{sqn}$), which lies in the frequency range $[f_1, f_m]$. For an input containing two frequency components ($f_1$ and $f_2$), the optimal SF $f^*_s$ can be obtained by solving formula (23) and written as:

$$f^*_s = \frac{\sqrt[5]{c_1 f_2^4} f_1 + \sqrt[5]{c_2 f_1^4} f_2}{\sqrt[5]{c_1 f_2^4} + \sqrt[5]{c_2 f_1^4}} \quad (24)$$

For an input with multiple frequencies, the solution of formula (23), namely $f^*_s$, cannot be expressed explicitly. At this point, formula (23) can be solved by the Newton method. In a word, when $f_s = f^*_s$, $\varepsilon sqn$ may reach the minimum value.

Further, the present disclosure also provides a preferred mode of time step. As can be seen from the above description, the optimal SF is obtained by solving formula (23), which is equivalent to solving $$\sum_{i=1}^{m} c_i \frac{(f_i - f_s)^5}{f_i^4} = 0 \quad (25)$$

It can be found that in formula (25), ci is related to the step size. Therefore, the influence of step size on the optimal SF needs further research. Conventionally, $T_s \gg \Delta t$, which indicates that $n \gg 0$. Therefore, it is easily found that $$\frac{n}{2} \gg \left| \sum_{k=0}^{n} \frac{\cos(4\pi f_i k \Delta t)}{2} \right|.$$

$c_i$ may be approximated to:

$$c_i = \frac{A_i^2 n}{2} \quad (26)$$

It can be seen from formula (26) that ci will change as $\Delta t$. However, the magnification or reduction factors of $c_1, \ldots, c_m$ are the same. Therefore, the solution of formula (25) does not change with the change in time-step size. It indicates that the step size does not affect the value of the optimal SF. In addition, given the error margin, an appropriate maximum time-step size can be selected according to formula (20).

According to the above embodiments, the present disclosure provides a method of a shifted frequency (SF)-based electromagnetic transient simulation on the basis of the optimal SF. FIG. 3 is a process schematic of the optimized SF-based electromagnetic transient simulation provided in the present disclosure. As shown in FIG. 3, the process includes:

Step 1: the system is initialized;

Step 2: an equivalent node admittance matrix G is calculated;

Step 3: according to the node voltage and branch current, the historical current source Ihist is calculated;

Step 4: according to the node voltage and branch current, etc., the injection current Is is calculated;

Step 5, the node voltage equation GU=Is+Ihist is solved to obtain the node voltage of the system.

Step 6: the branch current is calculated;

Step 7: an algorithm based on the recursive discrete Fourier transform (RDFT) is adopted to detect the frequency and amplitude of electrical quantities in the system.

Step 8: According to the frequency and the amplitude with different components, the optimal SF is calculated by formula (23), and the process proceeds to the next step.

The optimization device of SF-based electromagnetic transient simulation provided by the present disclosure will be described below, and the optimization device of SF-based electromagnetic transient simulation described below may refer to the optimization method of the SF-based electromagnetic transient simulation described above, and vice versa.

Figure 4:
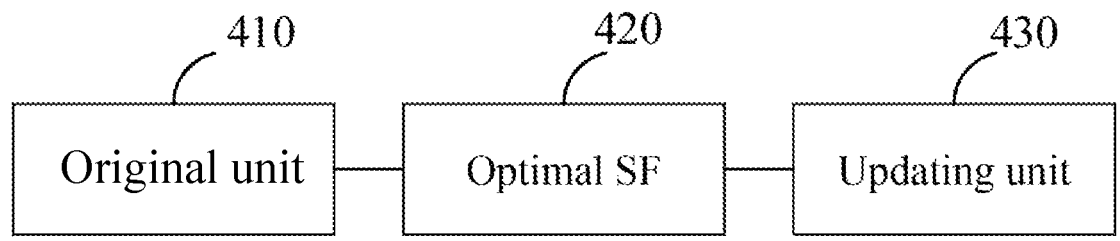
FIG. 4 is a structural schematic of an optimization unit of the SF-based electromagnetic transient simulation provided in the present disclosure.

FIG. 4 is a structural schematic of an optimization unit of the SF-based electromagnetic transient simulation provided in the present disclosure. As shown in FIG. 4, it includes an original unit 410, an optimal SF unit 420, and an updating unit 430;

The original unit 410 is used for determining a current amplitude and a voltage frequency based on a node voltage and a branch current calculated from a shifted frequency on a basis of a current time step;

The optimal SF unit 420 is used for determining an optimal shifted frequency of the current time step based on the current amplitude and the voltage frequency; and The updating unit 430 is used for updating the shifted frequency by adopting the optimal shifted frequency of the current time step for calculating a node voltage and a branch current of the next time step.

The present disclosure provides an optimization unit of a shifted frequency (SF)-based electromagnetic transient simulation, which is used for determining a current amplitude and a voltage frequency based on a node voltage and a branch current calculated from a shifted frequency on a basis of a current time step; determining an optimal shifted frequency of the current time step based on the current amplitude and the voltage frequency; and updating the shifted frequency by adopting the optimal shifted frequency of the current time step for calculating a node voltage and a branch current of the next time step. By optimizing and updating the shifted frequency in every time step where the voltage and the current are solved in the electromagnetic transient simulation, the shifted frequency gradually reaches the optimal value along with the time step, namely the best match with the set time step may lead to the highest simulation accuracy. Therefore, the electromagnetic transient simulation that is carried out after the shifted frequency reaches the best may output accurate current and voltage simulation results. Therefore, the unit provided in the present disclosure may gradually update and optimize the shifted frequency in the simulation process so to enable the shifted frequency to reach the best, thus ensuring the accuracy of output current and voltage simulation results.

According to the above embodiments, this unit also includes a cut-off unit which is used for:

If the next time step reaches a default simulation time, ending the calculation of the node voltage and the branch current of the next time step.

According to the above embodiments, in this unit, the optimal SF unit is specifically used for:

By taking the minimum error between a measured analytic signal response (determined by the current amplitude and the voltage frequency) and a theoretical analytic signal response (determined by the current amplitude and the voltage frequency) as a constraint, determining the optimal shifted frequency of the current time step.

According to the above embodiments, in this unit, the determination of the measured analytic signal response in the method specifically includes:

Determining an input of a linear time invariant (LTI) system based on the current amplitude and the voltage frequency; and Determining a measured analytic signal response in the SF-based electromagnetic transient modeling based on the input.

According to the above embodiments, in the unit, the measured analytic signal response $o_{sf}(t)$ is calculated by the following formula:

$$o_{st}(t) = \frac{K_I A}{j2\pi f} \frac{\pi f \Delta t}{\pi f_s \Delta t + \tan(\pi(f - f_s)\Delta t)} e^{j2\pi ft}$$

Where $\Delta t$ is the time-step size, $f_s$ is the optimal shifted frequency to be determined of a current time step, $f$ is the voltage frequency, $A$ is the current amplitude, and $K_I$ is the gain of the linear time invariant (LTI) system.

According to the above embodiment, in this unit, an error between the measured analytic signal response and a theoretical analytic signal response (determined by the current amplitude and the voltage frequency) is expressed by the following formula:

$$\varepsilon_s(t) = e^{j2\pi ft} \frac{K_I A}{j2\pi f} \left(1 - \frac{\pi f \Delta t}{\pi f_s \Delta t + \tan(\pi(f - f_s)\Delta t)}\right)$$

Wherein $\varepsilon_s(t)$ is an error between the measured analytic signal response $o_{sf}(t)$ and the theoretical analytic signal response $o_s(t)$, $$o_s(t) = \frac{K_I A}{j2\pi f} e^{j2\pi ft};$$

Correspondingly, the step of taking the minimum error between a measured analytic signal response (determined by the current amplitude and the voltage frequency) and a theoretical analytic signal response (determined by the current amplitude and the voltage frequency) as a constraint specifically comprises:

$\varepsilon_s(t)$ is reduced into a square of 2-norm error $\varepsilon_{sqn}$:

$$\varepsilon_{sqn} = c\left(\frac{K_I}{2\pi f} \frac{\pi(f_s - f)\Delta t + \tan(\pi(f - f_s)\Delta t)}{\pi f_s \Delta t + \tan(\pi(f - f_s)\Delta t)}\right)^2$$

$$c = \sum_{k=0}^{n}\left(A^2 \frac{1 - \cos(4\pi f k \Delta t)}{2}\right), n = \frac{T_s}{\Delta t}, k \times \Delta t = t$$

Where Ts is a default simulation time, and k is a number of time steps at time t;

When $f_s$ and $\Delta t$ satisfy a constraint $|f-f_s|<f\,\&\,|f-f_s|\Delta t<<1$, $f_s$ in a min $\varepsilon_s(t)$ optimization model is determined.

According to the above embodiment, in this unit, if there are m frequency component inputs in the linear time-invariant (LTI) system, the square of the 2-norm error $\varepsilon_{sqn}$ is calculated by the following formula:

$$\varepsilon_{sqn} = K_I^2 \frac{\pi^2 \Delta t^4}{36} \sum_{i=1}^{m} c_i \frac{(f_i - f_s)^6}{f_i^4}$$

Wherein $$c_i = \sum_{k=0}^{n}\left(A_i^2 \frac{1 - \cos(4\pi f_i k \Delta t)}{2}\right) > 0,$$

$f_i$ is the ith frequency, and $f_1 < \ldots < f_i < \ldots < f_m$, and $A_i$ is an amplitude of the ith frequency component.

Figure 5:
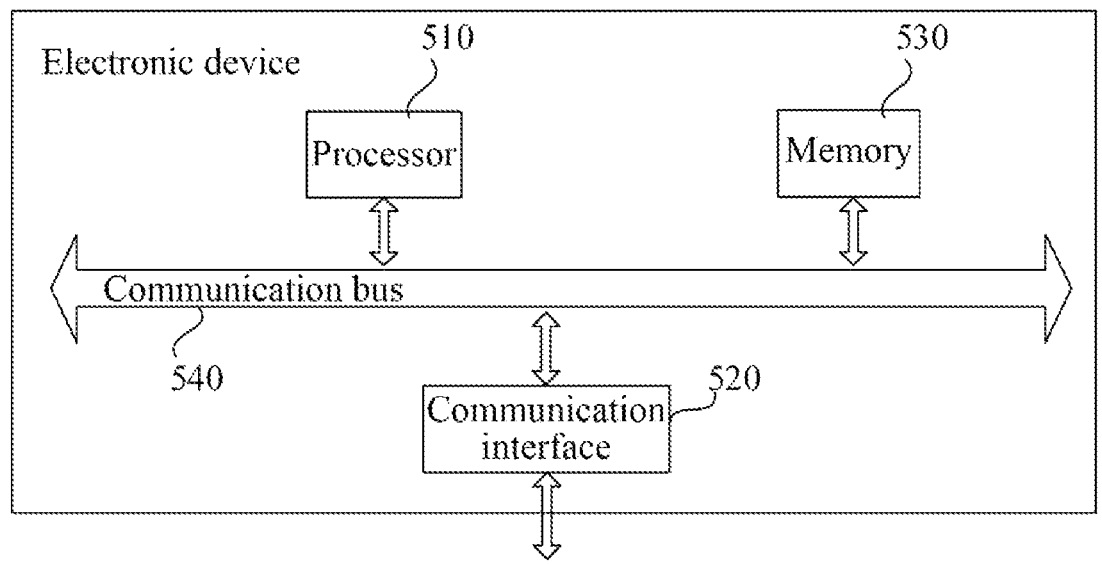
FIG. 5 is a physical structure schematic of an electronic device provided in the present disclosure.

FIG. 5 is a physical structure schematic of an electronic device provided in the present disclosure. As shown in FIG. 5, the electronic device may include a processor 510, a communication interface 520, a memory 530 and a communication bus 540, wherein the processor 510, the communication interface 520 and the memory 530 communicate with each other through the communication bus 540. The processor 510 may call logic instructions in the memory 530 to execute the optimization method of the SF-based electromagnetic transient simulation, wherein the method includes: determining a current amplitude and a voltage frequency based on a node voltage and a branch current calculated from a shifted frequency on a basis of a current time step; determining an optimal shifted frequency of the current time step based on the current amplitude and the voltage frequency; and updating the shifted frequency by adopting the optimal shifted frequency of the current time step for calculating a node voltage and a branch current of the next time step.

In addition, the logic instructions in the above-mentioned memory 530 can be realized in the form of software functional units, and can be stored in a computer-readable storage medium when sold or used as an independent product. Based on this understanding, the technical scheme (itself in essence, or a part that contributes to the technology in the prior art, or part of the technical scheme) of the present disclosure can be embodied in the form of a software product, which is stored in a storage medium and includes several instructions to enable a computer device (which can be a personal computer, a server, or a network device, etc.) to execute all or part of the steps of the methods described in each embodiment of the present disclosure. The above-mentioned storage media include: a U disk, a mobile hard disk, an ROM (Read-Only Memory), an RAM (Random Access Memory), a magnetic disk or an optical disk, and other various media which can store program codes.

In another aspect, the present disclosure also provides a computer program product which includes a computer program stored on the non-transient computer-readable storage medium and containing program instructions that, when executed by a computer, enable the computer to execute the optimization method of the SF-based electromagnetic transient simulation provided by various methods mentioned above, the optimization method including: determining a current amplitude and a voltage frequency based on a node voltage and a branch current calculated from a shifted frequency on a basis of a current time step; determining an optimal shifted frequency of the current time step based on the current amplitude and the voltage frequency; and updating the shifted frequency by adopting the optimal shifted frequency of the current time step for calculating a node voltage and a branch current of the next time step.

In still another aspect, the present disclosure provides a non-transient computer-readable storage medium, wherein a computer program is stored on the storage medium and, when executed by a processor, implements the optimization method of the SF-based electromagnetic transient simulation provided by various methods mentioned above, the optimization method including: determining a current amplitude and a voltage frequency based on a node voltage and a branch current calculated from a shifted frequency on a basis of a current time step; determining an optimal shifted frequency of the current time step based on the current amplitude and the voltage frequency; and updating the shifted frequency by adopting the optimal shifted frequency of the current time step for calculating a node voltage and a branch current of the next time step.

The server embodiments described above are only schematic, in which the units described as separate components may or may not be physically separated, and the components displayed as units may or may not be physical units, namely they may be located in a same place or distributed to multiple network units. Some or all of the modules can be selected as practically required so as to achieve the purpose of this embodiment. Those of ordinary skills in the art may understand and implement the modules without creative work.

By virtue of the description of the above embodiments, those skilled in the art can clearly understand that each embodiment can be realized by means of the combination of software and necessary general hardware platforms, and of course, it can also be realized by hardware. Based on such understanding, the technical scheme (itself in essence, or a part that contributes to the technology in the prior art, or part of the technical scheme) of the present disclosure can be embodied in the form of a software product, wherein the computer software product can be stored in a computer-readable storage medium, such as ROM/RAM, a magnetic disk, an optical disk, etc., and includes several instructions to enable a computer device (which can be a personal computer, a server, or a network device, etc.) to execute the methods described in various embodiments or some parts of the embodiments.

Finally, it is noted that the above embodiments are only for the purpose of illustrating the technical scheme of the present disclosure without limiting it. Although a detailed specification is given for the present disclosure by reference to above-mentioned embodiments, those of ordinary skills in the art should understand that he/she can still perform modifications on the technical schemes described in the above embodiments, or equivalent replacement of some technical features from the technical schemes. However, such modifications or replacement do not make the corresponding technical schemes depart in nature from the spirit and scope of those in each embodiment of the present disclosure.

What is claimed is:

1. An optimization method of a shifted frequency (SF)-based electromagnetic transient simulation, comprising:
   determining a current amplitude and a voltage frequency according to a node voltage and a branch current calculated by an SF-based electromagnetic transient simulation device based on a shifted frequency at a current time step, wherein the SF-based electromagnetic transient simulation device comprising a memory storing an existing program for SF-based electromagnetic transient simulation and a processor;
   determining an optimal shifted frequency of the current time step based on the current amplitude and the voltage frequency, which comprises determining the optimal shifted frequency of the current time step by using a minimum error between a measured analytic signal response, determined by the current amplitude and the voltage frequency, and a theoretical analytic signal response, determined by the current amplitude and the voltage frequency, as a constraint; and
   updating the shifted frequency by adopting the optimal shifted frequency of the current time step, wherein updated shifted frequency is used by the SF-based electromagnetic transient simulation device for calculating a node voltage and a branch current at the next time step.

2. The optimization method of the SF-based electromagnetic transient simulation according to claim 1, also comprising:
   In response to the next time step reaching a default simulation time, ending the calculation of the node voltage and the branch current of the next time step.

3. The optimization method of the SF-based electromagnetic transient simulation according to claim 1, wherein the determination of the measured analytic signal response comprises:
   determining an input of a linear time invariant (LTI) system based on the current amplitude and the voltage frequency; and
   determining a measured analytic signal response in an SF-based electromagnetic transient modeling based on the input.

4. The optimization method of the SF-based electromagnetic transient simulation according to claim 3, wherein the measured analytic signal response $o_{st}(t)$ is calculated by the following formula:

$$o_{st}(t) = \frac{K_I A}{j2\pi f} \frac{\pi f \Delta t}{\pi f_s \Delta t + \tan(\pi (f - f_s)\Delta t)} e^{j2\pi ft},$$

where t is time, $\Delta t$ is the time-step size, $f_s$ is the optimal shifted frequency to be determined of a current time step, f is the voltage frequency, A is the current amplitude, and $K_I$ is the gain of the linear time-invariant (LTI) system.

5. The optimization method of the SF-based electromagnetic transient simulation according to claim 4, wherein an error between the measured analytic signal response and a theoretical analytic signal response, determined by the current amplitude and the voltage frequency is expressed by the following formula:

$$\varepsilon_s(t) = e^{j2\pi ft} \frac{K_I A}{j2\pi f} \left(1 - \frac{\pi f \Delta t}{\pi f_s \Delta t + \tan(\pi(f - f_s)\Delta t)}\right),$$

wherein $\varepsilon_s(t)$ is an error between the measured analytic signal response $o_{st}(t)$ and the theoretical analytic signal response $o_s(t)$, $$o_s(t) = \frac{K_I A}{j2\pi f} e^{j2\pi ft};$$

wherein the step of taking the minimum error between a measured analytic signal response, determined by the current amplitude and the voltage frequency, and a theoretical analytic signal response, determined by the current amplitude and the voltage frequency, as a constraint comprises:

reducing $\varepsilon_s(t)$ into a square of 2-norm error $\varepsilon_{sqn}$ according to the following equation:

$$\varepsilon_{sqn} = c\left(\frac{K_I}{2\pi f} \frac{\pi(f_s - f)\Delta t + \tan(\pi(f - f_s)\Delta t)}{\pi f_s \Delta t + \tan(\pi(f - f_s)\Delta t)}\right)^2$$

wherein $$c = \sum_{k=0}^{n}\left(A^2 \frac{1 - \cos(4\pi f k \Delta t)}{2}\right), n = T_s/\Delta t, k \times \Delta t = t$$

wherein $T_s$ is a default simulation time, and k is a number of time steps at time t; and wherein fs and $\Delta t$ satisfy constraints $|f-f_s|<f$ and $|f-f_s|\Delta t<<1$, with fs being a min $\varepsilon_s(t)$ when an optimization model is determined.

6. The optimization method of the SF-based electromagnetic transient simulation according to claim 5, wherein if there are in frequency component inputs in the linear time-invariant (LTI) system, the square of the 2-norm error $\varepsilon_{sqn}$ is calculated by the following formula:

$$\varepsilon_{sqn} = K_I^2 \frac{\pi^2 \Delta t^4}{36} \sum_{i=1}^{m} C_i \frac{(f_i - f_s)^6}{f_i^4}$$

wherein $$C_i = \sum_{k=0}^{n}\left(A_i^2 \frac{1 - \cos(4\pi f_i k \Delta t)}{2}\right) > 0,$$

and $f_i$ is the ith frequency, so that $f_1 < \ldots < f_i < \ldots < f_m$, and $A_i$ is an amplitude of the ith frequency component.

7. An optimization unit of a shifted frequency (SF)-based electromagnetic transient simulation, comprising:

an original unit, used for determining a current amplitude and a voltage frequency according to a node voltage and a branch current calculated by an SF-based electromagnetic transient simulation device based on a shifted frequency at a current time step, wherein the electronic device comprising a memory storing an existing program for SF-based electromagnetic transient simulation and a processor;

an optimal SF unit, used for determining an optimal shifted frequency of the current time step based on the current amplitude and the voltage frequency, which comprises determining the optimal shifted frequency of the current time step by using a minimum error between a measured analytic signal response, determined by the current amplitude and the voltage frequency, and a theoretical analytic signal response, determined by the current amplitude and the voltage frequency, as a constraint; and an updating unit, used for updating the shifted frequency by adopting the optimal shifted frequency of the current time step, wherein updated shifted frequency is used by the SF-based electromagnetic transient simulation device for calculating a node voltage and a branch current at a next time step.

8. An electronic device, comprising a memory, a processor, and a computer program stored on the memory and running on the processor, wherein the processor, when executing the program, implements steps of the optimization method of the shifted frequency (SF)-based electromagnetic transient simulation, comprising:

determining a current amplitude and a voltage frequency according to a node voltage and a branch current calculated by the electronic device based on a shifted frequency on a basis of a current time step, wherein the electronic device comprising a memory storing an existing program for SF-based electromagnetic transient simulation and a processor;

determining an optimal shifted frequency of the current time step based on the current amplitude and the voltage frequency, which comprises determining the optimal shifted frequency of the current time step by using a minimum error between a measured analytic signal response, determined by the current amplitude and the voltage frequency, and a theoretical analytic signal response, determined by the current amplitude and the voltage frequency, as a constraint; and updating the shifted frequency by adopting the optimal shifted frequency of the current time step, which is used for the electronic device calculating a node voltage and a branch current of the next time step.

9. The electronic device according to claim 8, wherein the processor is configured to:

in response to the next time step reaching a default simulation time, end the calculation of the node voltage and the branch current of the next time step.

10. The electronic device according to claim 9, wherein the determination of the measured analytic signal response comprises:

determining an input of a linear time-invariant (LTI) system based on the current amplitude and the voltage frequency; and determining a measured analytic signal response in the SF-based electromagnetic transient modeling based on the input.

11. The electronic device according to claim 10, wherein the measured analytic signal response $o_{st}(t)$ is calculated by the following formula:

$$o_{st}(t) = \frac{K_I A}{j2\pi f} \frac{\pi f \Delta t}{\pi f_s \Delta t + \tan(\pi(f - f_s)\Delta t)} e^{j2\pi ft}$$

wherein t is time, $\Delta t$ is the time-step size, $f_s$ is the optimal shifted frequency to be determined of a current time step, f is the voltage frequency, A is the current amplitude, and $K_I$ is the gain of the linear time-invariant (LTI) system.

12. The electronic device according to claim 11, wherein an error between the measured analytic signal response and a theoretical analytic signal response, determined by the current amplitude and the voltage frequency, is expressed by the following formula:

$$\varepsilon_s(t) = e^{j2\pi ft} \frac{K_I A}{j2\pi f} \left(1 - \frac{\pi f \Delta t}{\pi f_s \Delta t + \tan(\pi(f - f_s)\Delta t)}\right)$$

wherein $\varepsilon_s(t)$ is an error between the measured analytic signal response $o_{st}(t)$ and the theoretical analytic signal response $o_s(t)$, wherein $$o_s(t) = \frac{K_I A}{j2\pi f} e^{j2\pi ft};$$

wherein, the step of taking the minimum error between a measured analytic signal response, determined by the current amplitude and the voltage frequency, and a theoretical analytic signal response, determined by the current amplitude and the voltage frequency, as a constraint comprises:

reducing $\varepsilon_s(t)$ into a square of 2-norm error $\varepsilon_{sqn}$ using the following formula:

$$\varepsilon_{sqn} = c\left(\frac{K_I}{2\pi f} \frac{\pi(f_s - f)\Delta t + \tan(\pi(f - f_s)\Delta t)}{\pi f_s \Delta t + \tan(\pi(f - f_s)\Delta t)}\right)^2,$$

wherein $$c = \sum_{k=0}^{n}\left(A^2 \frac{1 - \cos(4\pi f k \Delta t)}{2}\right), n = T_s/\Delta t, k \times \Delta t = t,$$

wherein $T_s$ is a default simulation time, and k is a number of time steps at time t;

when $f_s$ and $\Delta t$ satisfy constraints $|f - f_s| < f$ and $|f - f_s|\Delta t \ll 1$, wherein fs in a min $\varepsilon_s(t)$, determining that optimization is completed.

13. The electronic device according to claim 12, wherein in response to the existence of m frequency component inputs in the linear time-invariant (LTI) system, the processor is configured to calculate the square of the 2-norm error $\varepsilon_{sqn}$ by the following formula:

$$\varepsilon_{sqn} = K_I^2 \frac{\pi^2 \Delta t^4}{36} \sum_{i=1}^{m} C_i \frac{(f_i - f_s)^6}{f_i^4},$$

wherein $$C_i = \sum_{k=0}^{n}\left(A_i^2 \frac{1 - \cos(4\pi f_i k \Delta t)}{2}\right) > 0,$$

and $f_i$ is the ith frequency, so that $f_1 < \ldots < f_i < \ldots < f_m$, and $A_i$ is an amplitude of the ith frequency component.

* * * * *